United States Patent
Sharma

(10) Patent No.: US 12,340,694 B2
(45) Date of Patent: Jun. 24, 2025

(54) DEVICE AND METHOD FOR AVOIDING COLLISIONS BETWEEN A TURNING COMBINATION VEHICLE AND A ROAD USER

(71) Applicant: Volvo Truck Corporation, Gothenburg (SE)

(72) Inventor: Deepak Sharma, Hoshiarpur Punjab (IN)

(73) Assignee: Volvo Truck Corporation, Gothenburg (SE)

( * ) Notice: Subject to any disclaimer, the term of this patent is extended or adjusted under 35 U.S.C. 154(b) by 252 days.

(21) Appl. No.: 18/093,411

(22) Filed: Jan. 5, 2023

(65) Prior Publication Data

US 2023/0282113 A1    Sep. 7, 2023

(30) Foreign Application Priority Data

Mar. 3, 2022 (EP) .................................... 22159956

(51) Int. Cl.
*G08G 1/16* (2006.01)
*B60W 30/09* (2012.01)
(Continued)

(52) U.S. Cl.
CPC ............. *G08G 1/166* (2013.01); *B60W 30/09* (2013.01); *B60W 30/0953* (2013.01);
(Continued)

(58) Field of Classification Search
CPC ....... G08G 1/166; G08G 1/167; B60W 30/09; B60W 30/0953; B60W 30/0956;
(Continued)

(56) References Cited

U.S. PATENT DOCUMENTS

2017/0169703 A1\* 6/2017 Carrasco .................. B60Q 1/46
2018/0233048 A1   8/2018 Andersson et al.
(Continued)

FOREIGN PATENT DOCUMENTS

| DE | 102008043675 A1 \* | 5/2010 | ............ B62D 13/00 |
| DE | 102012017532 A1 | 5/2014 | |
| EP | 3944999 A1 | 2/2022 | |

OTHER PUBLICATIONS

Machine translation of DE102012017532 (Year: 2012).\*
(Continued)

*Primary Examiner* — Anne Marie Antonucci
*Assistant Examiner* — Patrick Daniel Mohl
(74) *Attorney, Agent, or Firm* — Withrow & Terranova, PLLC

(57) ABSTRACT

A method for managing a traffic situation associated with a road user and a turning combination vehicle. The combination vehicle comprises a first vehicle unit and a second vehicle unit. The method comprises obtaining sensor data indicative of traffic information from respective sides of the vehicle units from a set of sensors. The traffic information is indicative of respective turning motions of the vehicle units, and a position of the road user. The method further comprises determining respective trajectories of the vehicle units based on the respective turning motions of the vehicle units. The method further comprises establishing a region of interest extending along the determined trajectories. The method further comprises determining whether the position of the road user is within the established region of interest. The method further comprises, when the position of the road user is determined to be within the established region of interest, triggering preventive action.

20 Claims, 4 Drawing Sheets

(51) Int. Cl.
*B60W 30/095* (2012.01)
*B60W 30/14* (2006.01)
*B60W 50/14* (2020.01)

(52) U.S. Cl.
CPC ...... *B60W 30/0956* (2013.01); *B60W 30/143* (2013.01); *B60W 50/14* (2013.01); *B60W 2050/146* (2013.01); *B60W 2420/403* (2013.01); *B60W 2420/408* (2024.01); *B60W 2554/4044* (2020.02); *B60W 2554/4045* (2020.02)

(58) Field of Classification Search
CPC ............... B60W 30/143; B60W 50/14; B60W 2050/146; B60W 2420/403; B60W 2420/408; B60W 2554/4044; B60W 2554/4045; B60W 2050/143; B60W 2300/147; B60W 30/085; B60W 30/18145; B60W 2300/125; B60W 2300/13; B60W 2300/14; B60Q 5/006; B60Q 9/008

See application file for complete search history.

(56) References Cited

U.S. PATENT DOCUMENTS

| | | | |
|---|---|---|---|
| 2019/0056736 A1* | 2/2019 | Wood | G05D 1/0246 |
| 2021/0070362 A1* | 3/2021 | Xu | B62D 15/025 |
| 2021/0197852 A1* | 7/2021 | Fairfield | B60W 40/04 |
| 2022/0161782 A1* | 5/2022 | Laine | B60W 50/0097 |
| 2022/0219604 A1* | 7/2022 | Ma | B62D 15/0265 |

OTHER PUBLICATIONS

Machine translation of DE102008043675 (Year: 2008).*
Extended European Search Report for European Patent Application No. 22159956.6, mailed Aug. 31, 2022, 9 pages.

* cited by examiner

DEVICE AND METHOD FOR AVOIDING COLLISIONS BETWEEN A TURNING COMBINATION VEHICLE AND A ROAD USER

RELATED APPLICATIONS

The present application claims priority to European Patent Application No. 22159956.6, filed on Mar. 3, 2022, and entitled "DEVICE AND METHOD FOR AVOIDING COLLISIONS BETWEEN A TURNING COMBINATION VEHICLE AND A ROAD USER," which is incorporated herein by reference in its entirety.

TECHNICAL FIELD

The invention relates to a device and method for avoiding collisions between a turning combination vehicle and a road user. The invention will be described with respect to a combination vehicle, but is applicable to any vehicle which comprises at least two vehicle units such as a tractor and a trailer.

BACKGROUND

When turning long and/or wide combination vehicles such as Load, Haul and Dump (LHD) trucks, driver visibility is reduced or completely blocked by a number of blind spots. Visibility is typically reduced further for longer and/or wider vehicles. To reduce a risk of colliding with road users and obstacles when turning, combination vehicles are therefore typically arranged with different kinds of mirrors for better rear view. Additionally, the combination vehicles may have reverse cameras for parking assistance. Occasionally, combination vehicles are also provided with additional cameras, e.g. in the front of the vehicle. Using these tools, it is easier for a driver to view some of the blind spots. However, none of these tools completely remove the danger of turning long and/or wide combination vehicles. A particular problem arises when a combination vehicle comprising a tractor and trailer turns in a forward direction in proximity of a road user such as a car. Since the trailer has a much wider turning trajectory than the tractor, the driver of the car may easily misjudge the trajectory of the trailer and may try to overtake the turning combination vehicle even though the risk of collision is very high. Since such traffic situations occurs on the side of the combination vehicle, the road user may be in a blind spot of the driver of the combination vehicle such that the driver is not able to detect the road user before a collision.

Hence there is an ongoing strive to improve traffic safety when turning combination vehicles.

SUMMARY

An object of the invention is to improve traffic safety when turning a combination vehicle.

The object is achieved by a method according to claim 1. Hence, there is provided a method for managing a traffic situation associated with a road user and a turning combination vehicle. The combination vehicle comprises a first vehicle unit and a second vehicle unit. The first vehicle unit may be a tractor and the second vehicle unit may be a trailer. Any other suitable combination of vehicle units may apply. The method comprises:

Obtaining sensor data from a set of sensors. The sensor data is indicative of traffic information from respective sides of the first and second vehicle units. The traffic information is indicative of respective turning motions of the first and second vehicle units, and a position of the road user. In other words, the set of sensors monitors the first and second vehicle units and their sides.

Based on the respective turning motions of the first and second vehicle units, determining respective trajectories of the first and second vehicle units.

Based on the determined trajectories, establishing a region of interest extending along the determined trajectories.

Determining whether the position of the road user is within the established region of interest.

When the position of the road user is determined to be within the established region of interest, triggering a preventive action.

Since the region of interest extends along the determined trajectories of the first and second vehicle units and because the position of the road user is known from the sensor data, it is possible to trigger the preventive action, and thus avoiding or at least mitigating a risk of collision with the road user. In particular, the preventive action can be triggered long before the risk of collision is high. This is because the position of the road user is compared to a trajectory of the first and second vehicle units, and thus the preventive action may be triggered before the road user is dangerously close to the combination vehicle. Furthermore, since the sensor data is indicative of traffic information from respective sides of the first and second vehicle units, the road user may be detected even if it is located in a usual blind spot of the combination vehicle.

Optionally, triggering the preventive action comprises any one or more out of:
triggering an alert,
reducing a speed of the combination vehicle,
triggering an emergency stop of the combination vehicle, and
limiting a steering wheel angle of the first vehicle unit.

Optionally, triggering the alert comprises alerting a driver of the combination vehicle and/or alerting the road user by triggering a sound and/or light alert. In this way, any one or both of the road user and the driver of the combination vehicle may be alerted of a potential collision and may take a respective preventive action for collision avoidance.

Optionally, triggering the preventive action is further based on a shortest distance between the position of the road user and any one of the determined trajectories. For example, when the shortest distance is below a predetermined first distance threshold, the preventive action may comprise triggering an emergency stop of the combination vehicle. As another example, when the shortest distance is above the predetermined first distance threshold but below a predetermined second distance threshold the preventive action may comprise triggering a sound and/or light alert.

Optionally, the combination vehicle further comprises a third vehicle unit. The third vehicle unit may be a trailer. The obtained sensor data is in this embodiment further indicative of traffic information from the sides of the third vehicle unit. The traffic information is further indicative of a turning motion of the third vehicle unit. In these embodiments, determining the respective trajectories further comprises determining a trajectory of the third vehicle unit based on the turning motion of the third vehicle unit. In these embodiments, establishing the region of interest further comprises establishing the region of interest extending along the determined trajectory of the third vehicle unit. In other words, the region of interest extends along the trajectory of the first, second and third vehicle units, which trajectories may all be different.

Optionally, determining the respective trajectories of the first and second vehicle units is based on dimensions of the respective first and second vehicle units. For example, the sensor data may indicate a width, length, and shape of the first and second vehicle units which may be considered when determining the respective trajectories.

Optionally, the sensor data is further indicative of dimensions of objects loaded or mounted on the combination vehicle. In these embodiments, determining the respective trajectories of the first and second vehicle units is further based on the dimensions of the objects loaded or mounted on the combination vehicle.

Optionally, the method further comprises presenting the determined trajectories and the position of the road user on a display comprised in the first vehicle unit. In this way, the driver of the combination vehicle has a constant view of how the turning trajectories of the combination vehicle may risk collision with the road user.

According to a second aspect, there is provided a control unit to perform the method according to the first aspect. The control unit may be an electronic control unit.

According to a third aspect, there is provided an arrangement for a combination vehicle comprising a first vehicle unit and a second vehicle unit. The arrangement comprises a control unit according to the second aspect. The arrangement further comprises a set of sensors arranged in communicative connection with the control unit. The set of sensors comprises sensors configured to be arranged on each side of the first vehicle unit and the second vehicle unit, respectively.

Optionally, the set of sensors comprises a set of cameras.

Optionally, the set of sensors comprises any one or more out of:

Light Detection and Ranging (Lidar) sensors, and
Ultrasonic sensors.

According to a fourth aspect, there is provided a combination vehicle comprising a first vehicle unit, a second vehicle unit, and the arrangement according to the third aspect. Each side of the first vehicle unit and the second vehicle unit, respectively, is provided with at least one sensor from the set of sensors.

According to a fifth aspect, there is provided a computer program comprising program code means for performing the method according to the first aspect, when said program is run on a computer.

According to a sixth aspect, there is provided a computer program medium carrying a computer program comprising program code means for performing the method according to the first aspect, when said program is run on a computer.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
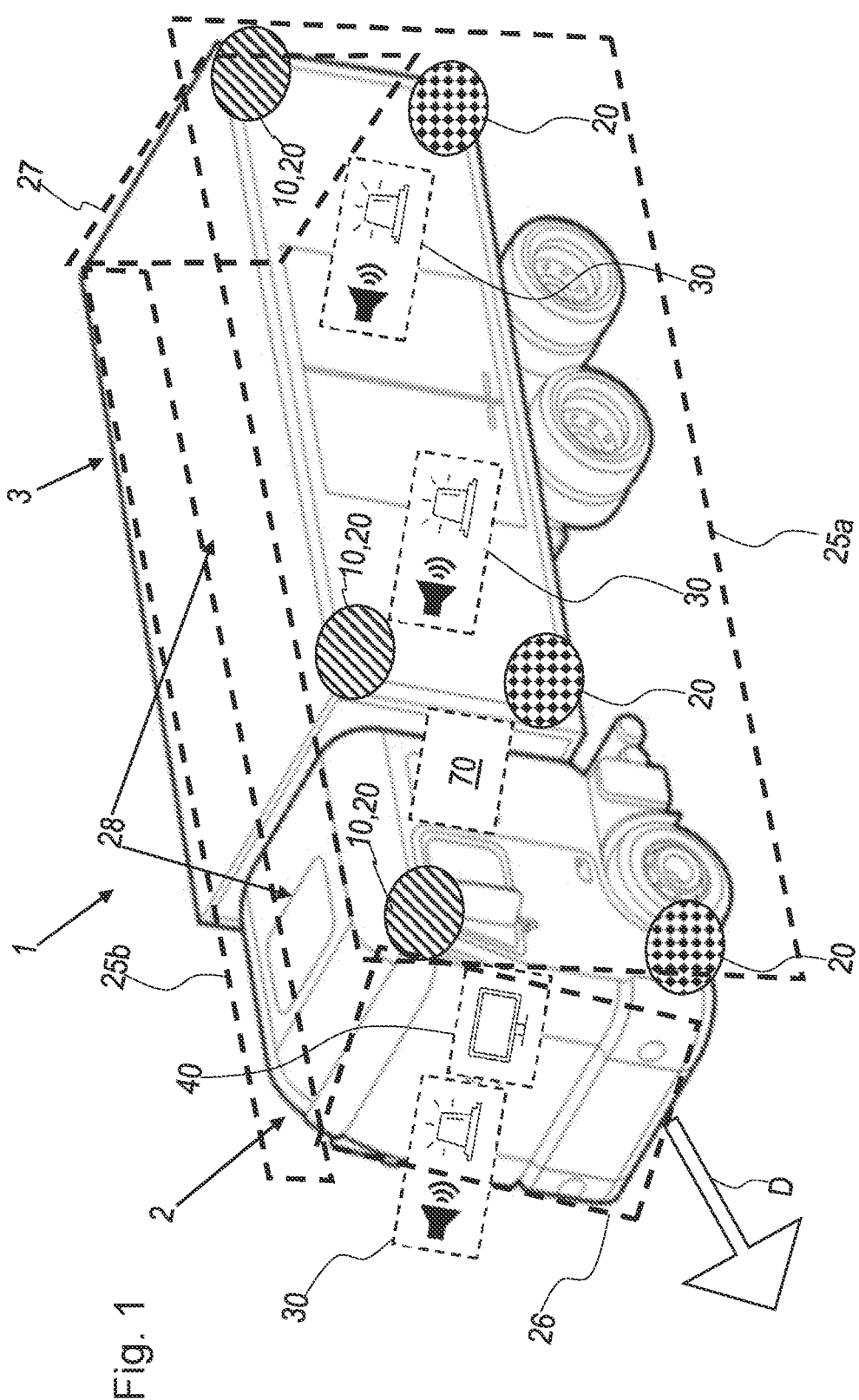
FIG. 1 is an illustration of a combination vehicle according to embodiments herein.

FIG. 1 is a schematic overview of a vehicle 1 in accordance with embodiments herein. FIG. 1 illustrates a combination vehicle 1, which in the illustrated embodiment comprises a first vehicle unit 2 and a second vehicle unit 3. The first vehicle unit 2 is in FIG. 1 illustrated as a tractor and the second vehicle unit 3 is illustrated as a trailer, but any other suitable combination, may also be applicable to embodiments herein, e.g., combinations may comprise at least any of a: truck, a semi-truck, a semi-trailer, a tractor, and a trailer. The combination vehicle 1 may in one embodiment be a road train comprising extra-long and/or extra-wide vehicle units, e.g. for transportation of large structures such as super structures. The combination vehicle 1 comprises a first side 25a, a second side 25b, a front part 26, and a rear part 27. The sides 25a, 25b extend along all vehicle units of combination vehicle 1, including the first vehicle unit 2 and the second vehicle unit 3. The respective sides 25a, 25b extend along a default forward driving direction D of the combination vehicle 1. The front part 26 may be a front part of the first vehicle unit 2, as illustrated by FIG. 1. The rear part 26 may be a rear part of the second vehicle unit 3, as illustrated by FIG. 1. The combination vehicle 1 is arranged with a set of sensors 20. Each side 25a, 25b, of the first vehicle unit 2 and the second vehicle unit 3 is at least arranged with one of the sensors in the set of sensors 20 (not shown for the second side 25b). In embodiments herein, especially when the second vehicle unit 3 is a long and/or wide trailer, it may be advantageous to arrange the second vehicle unit 3 with multiple sensors on each side 25a, 25b. For example, the set of sensors 20 may comprise at least one sensor on each side 25a, 25b arranged at the rear part 27 of the combination vehicle 1, e.g. within a predetermined distance from the rear part 27 of the combination vehicle 1. Similarly, the set of sensors 20 may comprise at least one sensor on each side 25a, 25b, arranged on the front part 26 of the second vehicle unit 3, e.g. within a predetermined distance from the front part 26 of the combination vehicle 1.

The set of sensors 20 are arranged to sense traffic information from respective sides 25a, 25b, of the combination vehicle 1. The traffic information is indicative of respective turning motions of the first and second vehicle units 2, 3, and current positions of road users in proximity of the first and second vehicle units 2, 3. In other words, the set of sensors 20 may be arranged to scan the surrounding sides 25a, 25b, of the first and second vehicle units 2, 3 while the first and second vehicle units 2, 3 are moving. To improve the scanning of the surrounding sides 25a, 25b, each of the first and second vehicle units 2, 3 may be provided with a plurality of sensors on each side 25a, 25b, of the respective vehicle unit. Additionally, or alternatively, the set of sensors 20 may comprise one or more sensors arranged on the front and/or rear part of the respective vehicle unit, which may sense traffic information in the front and/or rear side of the respective first and second vehicle units 2, 3. This traffic information may also be indicative of the respective turning motions of the first and second vehicle unit 2, 3.

The set of sensors 20 may comprise any suitable sensor for obtaining traffic information. For example, the set of sensors 20 may comprise a set of cameras 10. As illustrated in FIG. 1, the set of cameras 10 may typically be arranged on a top-side 28, e.g. roof-top, of each side 25a, 25b, of the first and second vehicle units 2, 3. In this configuration, the cameras 10 may each be directed downwards, e.g. by a fixed or adjustable angle, and arranged to monitor the respective sides 25a, 25b, of the first and second vehicle units 2, 3. In this way, the set of cameras 10 may be able to perceive the shape of the first and second vehicle unit 2, 3. Additionally, the set of cameras 10 may perceive the surroundings of the sides 25a, 25b of the first and second vehicle units 2, 3. The set of sensors 20 may also comprise Lidar sensors and/or ultrasonic sensors typically used for detecting road users' locations relative to the combination vehicle 1. Each sensor of the set of sensors 20 may be mounted at a respective known position of the first and second vehicle units 2, 3, such that it is possible to determine distances to road users detected by the respective sensor, and/or to enable sensor data fusion. Lidar and/or ultrasonic sensors are typically mounted in a lower position than the set of cameras 10, such that they are able to scan the surface of the road surrounding the first and second vehicle units 2, 3.

The set of sensors 20, may in a horizontal plane be directed to scan the side of their respective vehicle unit. In other words, each sensor in the set of sensors 20 are arranged to scan the side of their respective vehicle unit but may also be configured to partially also scan the front or rear part of their respective vehicle unit, e.g. the front part 26 and/or rear part 27 of the combination vehicle 1. In this way, a sensor arranged on a front and/or rear corner of the first or second vehicle unit 2, 3 may be able to have a sensor data coverage of both a part of the side of its respective vehicle unit and a part of the front and/or rear of the respective vehicle unit.

The combination vehicle 1 may be arranged with an alerting arrangement 30 comprising interior and/or exterior alerting units. The alerting units may be sound alerts and/or visual alerts for alerting a driver of the combination vehicle 1 and/or road users in proximity of the combination vehicle 1 of emerging dangers. The alerting arrangement 30 may be arranged to perform any of the alerts described in the embodiments herein.

The combination vehicle 1 may be arranged with a display 40. The display 40 may be arranged to display, to the driver of the combination vehicle 1, sensor data indicative of traffic information, or any related processed sensor data, which will be exemplified in embodiments herein.

Embodiments herein may be performed by a control unit 70. The control unit 70 may be an electronic control unit. The control unit 70 may be comprised in the combination vehicle 1 but may also be comprised in any other suitable location. The control unit 70 may be communicatively connected with any one or more out of: the set of sensors 20, the alerting arrangement 30, and the display 40.

Figure 2:
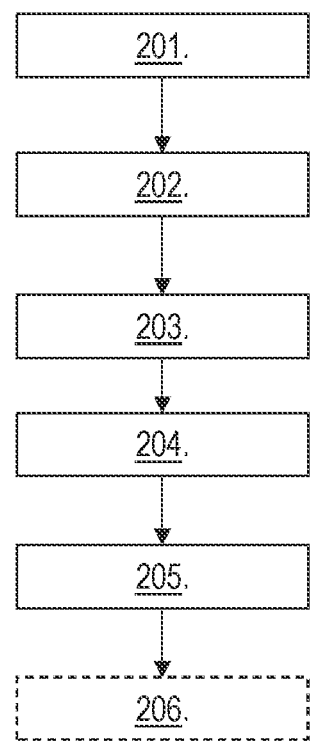
FIG. 2 is a flowchart of a method according to embodiments herein.

FIG. 2 illustrates a method for managing a traffic situation associated with a road user and the combination vehicle 1 according to embodiments herein. The method relates to a traffic situation wherein the combination vehicle 1 is turning, typically while also driving in a forward and turning direction. The combination vehicle 1 comprises the first vehicle unit 2 and the second vehicle unit 3. The method may be performed by the control unit 70. The method comprises the following actions described below, which actions may be taken in any suitable order. Optional actions are indicated by dashed boxes in FIG. 2.

Action 201

The method comprises obtaining sensor data from the set of sensors 20. The sensor data is indicative of traffic information from respective sides 25a, 25b, of the first and second vehicle units 2, 3. The traffic information is indicative of respective turning motions of the first and second vehicle units 2, 3, and a position of the road user. The position of the road user is the current position of the road user. In other words, the set of sensors 20 monitors the first and second vehicle units 2, 3 and their sides 25a, 25b, to obtain information of the turning motions of the first and second vehicle unit 2, 3 and the position of the road user. The sensor data may be senor data fused from multiple sensor types in the set of sensors 20. For example, the sensor data may be a combination of real-time video from the set of cameras 10 and sensor data from Lidar sensors arranged on the sides of the first and second vehicle unit 2, 3. In this way, the fused sensor data may comprise sensor data of the sides 25a, 25b, of the first and second vehicle units 2, 3, relative to a road using the set of cameras 10, and comprise sensor data of a scanned surroundings of the first and second vehicle units 2, 3 sides from the Lidar sensors. The position of the road user may be a position in a coordinate system relative to the combination vehicle 1 in a horizontal plane.

In some embodiments, the sensor data is further indicative of dimensions of objects loaded or mounted on the combination vehicle 1. For example, the set of cameras 10 may sense the shape and/or dimensions of combination vehicle 1 which thus include any objects attached to, or mounted on, the combination vehicle 1.

Action 202

The method further comprises determining respective trajectories of the first and second vehicle units 2, 3 based on the respective turning motions of the first and second vehicle units 2, 3. The respective trajectories of the first and second vehicle units 2, 3 comprise trajectories of how the respective first and second vehicle units 2, 3 will travel when performing their respective turning motions. Typically, the first and second vehicle units 2, 3 will have differing trajectories, e.g. as the first and second vehicle units 2, 3 have different sizes and characteristics. For example, when the first vehicle unit 2 is a tractor and the second vehicle unit 3 is a long and wide trailer, the second vehicle unit 3 will have a much wider trajectory than the trajectory of the first vehicle unit 1.

Determining the trajectories may be performed by means of an Artificial Intelligence (AI), i.e. by the use of a trained neural network or by the use of any other suitable data structure. Any suitable neural network may apply, e.g. a deep neural network or a convolutional neural network. The neural network may be trained in advance using training data from simulations. The training data may also be sensor data recorded from the set of sensors 20 when previously driving the first and second vehicle units 2, 3 with the set of sensors 20. The training data may also be recordings from other suitable sensor configurations from other combination vehicles.

In some embodiments, determining the respective trajectories of the first and second vehicle units 2, 3 is based on dimensions of the respective first and second vehicle units 2, 3. These dimensions may be pre-determined, known by the above-mentioned AI, or may be sensed by the set of cameras 10.

In some embodiments, determining the respective trajectories of the first and second vehicle units 2, 3 is further based on the dimensions of the objects loaded or mounted on the combination vehicle 1, e.g. as indicated by the sensor data obtained in action 201.

Action 203

The method further comprises establishing a region of interest extending along the determined trajectories based on the determined trajectories. The region of interest may be represented as an area in the coordinate system relative to the combination vehicle 1 in the horizontal plane, e.g. as in action 201. The region of interest may be an area defined by a predefined distance from the determined trajectories. In some embodiments, the region of interest is established as an area using the determined trajectories as a middle line, and spanning a predetermined width. Any other suitable region of interest which at least enables determining whether the position of the road user is within any one or both of the respective determined trajectories may be used.

Action 204

The method further comprises determining whether the position of the road user is within the established region of interest. Determining whether the position of the road user is within the established region of interest may be performed in any suitable manner, e.g. by means of simple arithmetic when the region of interest and the position of the road user is within the coordinate system described above and/or by means of an AI, e.g. the same as in above action 202.

Action 205

The method further comprises triggering a preventive action when the position of the road user 300 is determined to be within the established region of interest 310. The preventive action may thus prevent or mitigate risks for collision between the road user and the combination vehicle 1.

In some embodiments, the preventive action may comprise any one or more out of:
  triggering an alert, e.g. a sound or light alert,
  reducing a speed of the combination vehicle 1,
  triggering an emergency stop of the combination vehicle 1, and
  limiting a steering wheel angle of the first vehicle unit 2.

Any one or more out of the above-mentioned sound and/or light alerts may be triggered by the alerting arrangement 30. In some of these embodiments, limiting the steering wheel angle of the first vehicle unit 2 may limit the steering wheel such that the determined respective trajectories may at least not grow wider by increasing the wheel angle. The driver of the combination vehicle 1 may also be alerted by means of feeling the limited steering wheel when turning and can then take appropriate action. Additionally, or alternatively, triggering the alert comprises alerting a driver of the combination vehicle 1 and/or alerting the road user by triggering a sound and/or light alert. In other words, the sound and/or light alert may either be sounds and/or lights exterior and/or interior of the combination vehicle 1. The sound alert may for example be triggered by outside loudspeakers or speakers in the first vehicle unit 2. The light alert may comprise lighting outside warning lights or lighting lights inside the first vehicle unit 2, e.g. tell-tale lights on a dashboard. Triggering the light alerts may comprise the use of lights exterior to the first and second vehicle units 2, 3, e.g. lasers or Light-Emitting Diodes (LED) which light up an area on the road of the combination vehicle 1, corresponding to the established region of interest. This light alert may in some embodiments further be triggered to always be visible when the combination vehicle 1 is turning.

In some embodiments, triggering the preventive action is further based on a shortest distance between the position of the road user and any one of the determined trajectories.

For example, when the shortest distance is below a predetermined first distance threshold, the preventive action may comprise triggering an emergency stop of the combination vehicle. As another example, when the shortest distance is above the predetermined first distance threshold, but below a predetermined second distance threshold, the preventive action may comprise triggering a sound and/or light alert. These embodiments may be realized by dividing the region of interest into different zones, e.g. high, medium and low risk zones depending on the length of the shortest distance. The preventive action may thus be triggered when the position of the road user is in any one or both of the high risk zone and the medium risk zone. In some embodiments, only sound and/or light alerts are triggered when in the medium risk zone. In some embodiments, sound and/or light alerts are triggered in the high risk zone combined with automatic braking of the combination vehicle 1. When in a low risk zone, a minor warning may be issued, e.g. a tell-tale light may indicate to the driver of the combination vehicle 1 that there is a presence of a road user, but there is no immediate danger given the current position of the road user and the determined trajectories.

Action 206

The method may in some embodiments further comprise presenting the determined trajectories and the position of the road user on the display 40 comprised in the first vehicle unit 2. For example, the driver of the combination vehicle 1 may operate the combination vehicle 1 from the first vehicle unit 2. The driver may then see in the display 40, how the determined trajectories are determined with respect to the position of the road user. Additionally, the established region of interest may be presented, along with a warning when the preventive action is triggered. Additionally, a live feed, e.g. from the set of cameras 10, may be presented in the display 10. Since the display 40 may not be able to present all video from all cameras in the set of cameras 10, the video from the most relevant camera may be selected. The most relevant camera may be selected by manual input. Alternatively, the most relevant camera may be selected by determining which video is currently showing the road user, or a position closest to the road user.

The method of actions 201-206 above is applicable for any suitable number of vehicle units, for example the first vehicle unit 2 is a tractor pulling two or more trailers, including the second vehicle unit 3. In some of these embodiments, the combination vehicle 1 further comprises a third vehicle unit. In these embodiments, the obtained sensor data of action 201 is further indicative of traffic information from the sides of the third vehicle unit. In these embodiments, the traffic information is further indicative of a turning motion of the third vehicle unit. In these embodiments, determining the respective trajectories as in action 203, further comprises determining a trajectory of the third vehicle unit based on the turning motion of the third vehicle unit. In these embodiments, establishing the region of interest as in action 204 further comprises establishing the region of interest extending along the determined trajectory of the third vehicle unit.

The methods will now be further explained and exemplified in below embodiments. These below embodiments may be combined with any suitable embodiment as described above.

Figure 3:
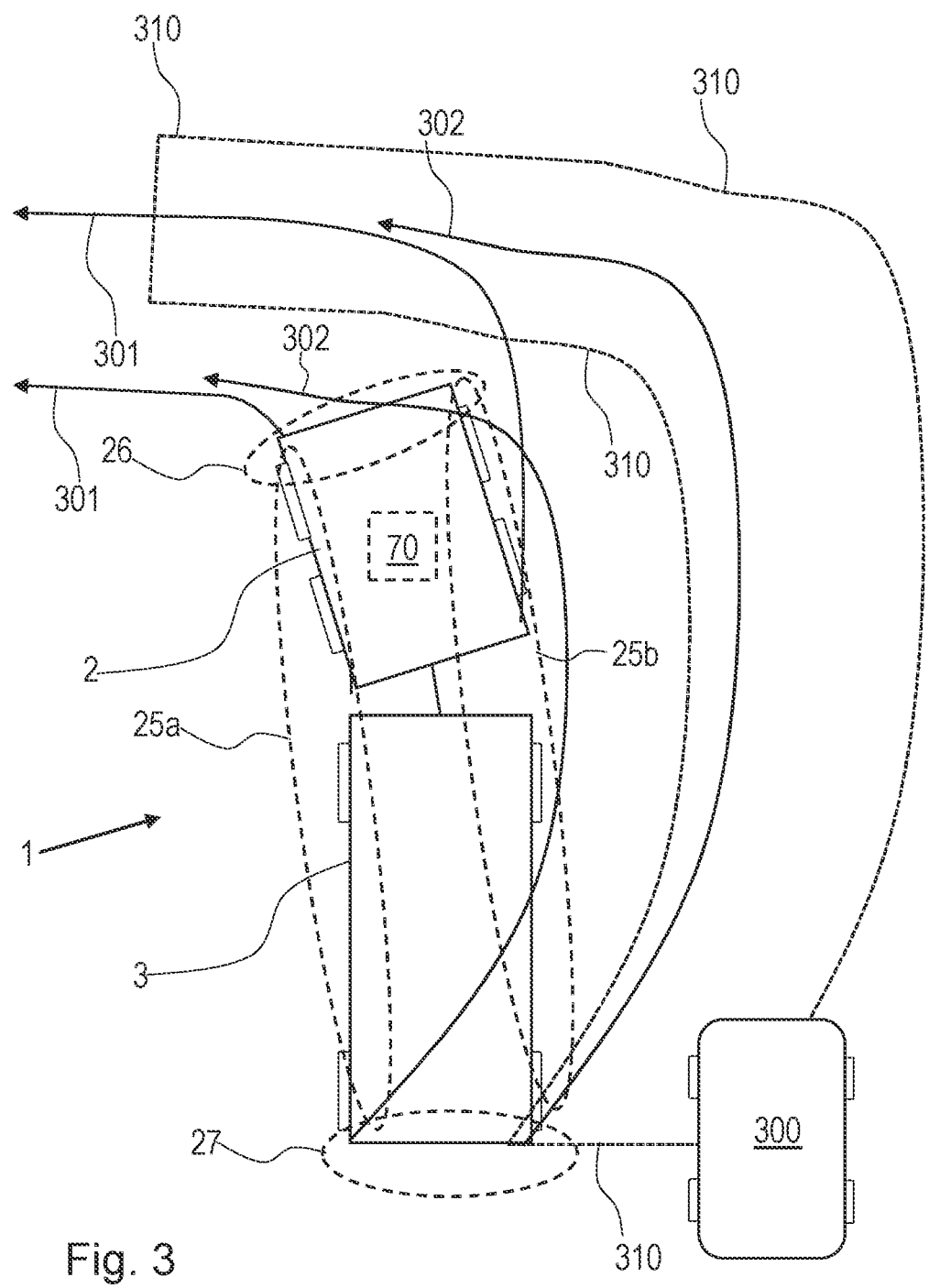
FIG. 3 is an example scenario illustrating embodiments herein.

FIG. 3 illustrates an example scenario according to embodiments herein. The example scenario illustrates the combination vehicle 1 comprising the first and second vehicle units 2, 3 and a road user 300. The combination vehicle 1 turns, and obtains sensor data indicative of traffic information from respective sides 25a, 25b, of the first and second vehicle units 2, 3, e.g. by means of the control unit 70, as in action 201 above. The traffic information indicates respective turning motions of the first and second vehicle units 2, 3 and the position of the road user 300. This is possible by the use of sensors on each side 25a, 25b, of the first and second vehicle units 2, 3, which are able to sense the surroundings of the combination vehicle 1, including the shape of the first and second vehicle units 2, 3, and how they are turning in relation to its surroundings. Using the sensor data, the combination vehicle 1, e.g. by means of the control unit 70, determines a first trajectory 301 for the first vehicle unit 2 and a second trajectory 302 for the second vehicle unit 3, e.g. as in action 202 above. Each of the first and second trajectories 301, 302, indicates current and future turning motions of the first and second vehicle units 2, 3. The combination vehicle 1, e.g. by means of the control unit 70, establishes a region of interest 310, e.g. as in action 203. The region of interest 310 is in the example scenario indicated by the area within the dashed lines. In the example scenario, the road user 300 is within the region of interest 310 and is trying to overtake the combination vehicle 1. The combination vehicle 1, e.g. by means of the control unit 70, determines that the road user 300 is within the region of interest 310, e.g. as in action 204 above. The road user 300 may not understand that its position is within the trajectory of the turning combination vehicle 1. To avoid the risk of collision with the road user 300 the combination vehicle 1 e.g. by means of the control unit 70, triggers a preventive action, e.g. as in action 205 above.

To perform the method actions described herein, the control unit 70 may be configured to perform any one or more of the above actions 201-206 or any of the other examples or embodiments herein. The control unit 70 may for example comprise an arrangement depicted in FIG. 4A and FIG. 4B.

The control unit 70 may comprise an input and output interface 400 configured to communicate any necessary components or entities of embodiments herein. The input and output interface 400 may comprise a wireless and/or wired receiver (not shown) and a wireless and/or wired transmitter (not shown). The control unit 70 may be arranged in any suitable location of the autonomous vehicle. The control unit 70 may for example be part of any suitable Advanced Driver Assistance System (ADAS).

The control unit 70 may further be configured to, e.g. by means of an obtaining unit 401 in the control unit 70, obtain sensor data from a set of sensors 20, e.g. as in action 201 above.

The control unit 70 may further be configured to, e.g. by means of a determining unit 402 in the control unit 70, determine respective trajectories of the first and second vehicle units 2, 3, e.g. as in action 202 above.

The control unit 70 may further be configured to, e.g. by means of an establishing unit 403 in the control unit 70, establish a region of interest extending along the determined trajectories, e.g. as in action 203 above.

The control unit 70 may further be configured to, e.g. by means of the determining unit 402 in the control unit 70, determine whether the position of the road user is within the established region of interest, e.g. as in action 204 above.

The control unit 70 may further be configured to, e.g. by means of a triggering unit 404 in the control unit 70, trigger a preventive action, when the position of the road user is determined to be within the established region of interest, e.g. as in action 205 above.

The control unit 70 may further be configured to, e.g. by means of a presenting unit 405 in the control unit 70, present the determined trajectories and the position of the road user on a display comprised in the first vehicle unit 2, e.g. as in action 206 above.

Figure 4A:
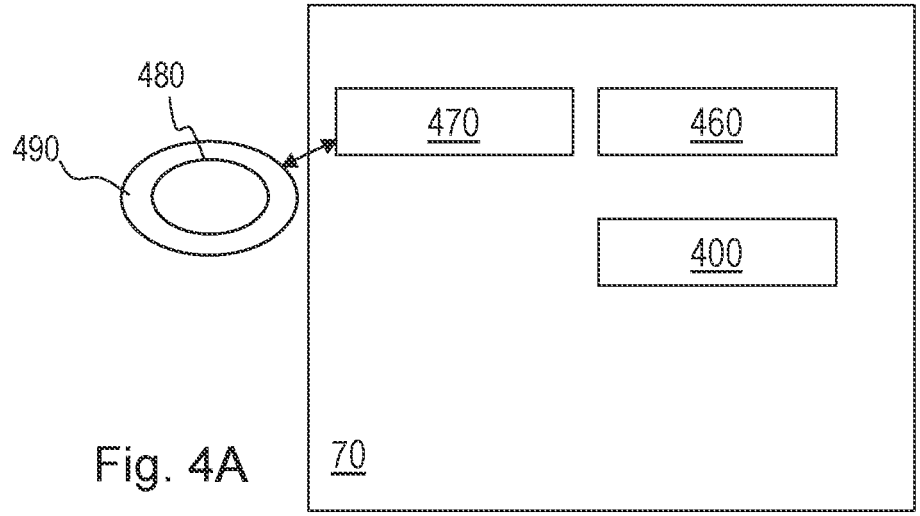
FIGS. 4A and 4B are illustrations of a control unit according to embodiments herein.
Figure 4B:
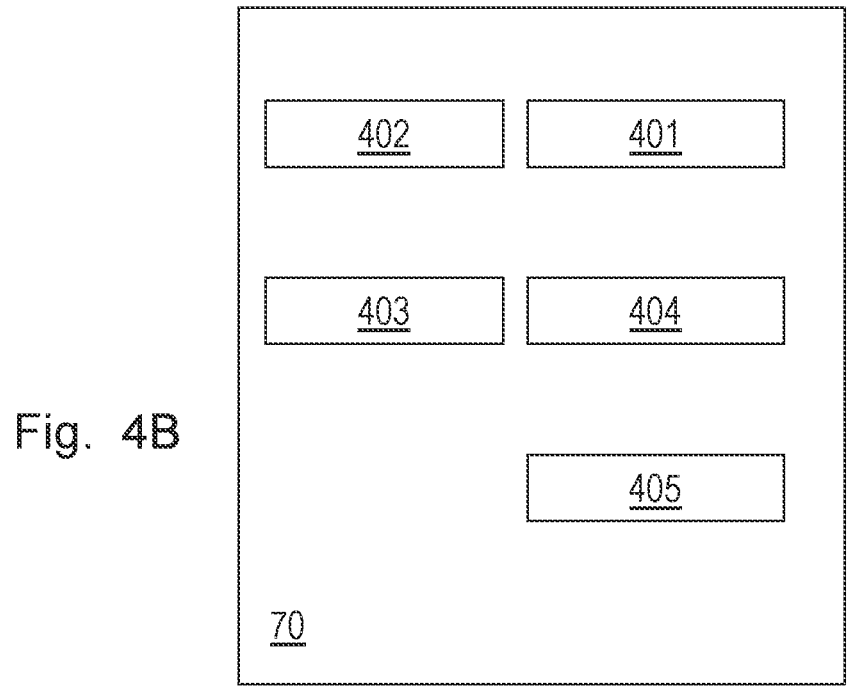

The embodiments herein may be implemented through a processor or one or more processors, such as the processor 460 of a processing circuitry in the control unit 70 depicted in FIG. 4A, together with computer program code for performing the functions and actions of the embodiments herein. The program code mentioned above may also be provided as a computer program medium, for instance in the form of a data computer readable medium carrying computer program code for performing the embodiments herein when being loaded into the control unit 70. One such computer readable medium may be in the form of a memory stick. The computer program code may furthermore be provided as pure program code on a server and downloaded to the control unit 70.

The control unit 70 may further comprise a memory 470 comprising one or more memory units. The memory 470 comprises instructions executable by the processor in control unit 70. The memory 470 is arranged to be used to store e.g. information, indications, data, configurations, trajectories, positions, region of interests, sensor data, and applications to perform the methods herein when being executed in the control unit 70. The memory 460 may in some embodiments comprise the storage medium 420.

In some embodiments, a computer program 480 comprises instructions, which when executed by a computer, e.g. the at least one processor 460, cause the at least one processor of the control unit 70 to perform the actions 201-206 above.

In some embodiments, a computer-readable storage medium 490 comprises the respective computer program 480. The computer-readable storage medium 490 may comprise program code for performing the steps of any one of actions 201-206 above when said program product is run on a computer, e.g. the at least one processor 460.

Those skilled in the art will appreciate that the units in the control unit 70 described above may refer to a combination of analogue and digital circuits, and/or one or more processors configured with software and/or firmware, e.g. stored in the control unit 70, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

It is to be understood that the present invention is not limited to the embodiments described above and illustrated in the drawings; rather, the skilled person will recognize that many changes and modifications may be made within the scope of the appended claims.

The invention claimed is:

1. A method for managing a traffic situation associated with a road user and a turning combination vehicle, the combination vehicle comprising a first vehicle unit and a second vehicle unit, the method comprising:
obtaining sensor data from a set of sensors, wherein the sensor data is indicative of traffic information from respective sides of the first and the second vehicle units, wherein the traffic information is indicative of respective turning motions of the first and the second vehicle units, and a position of the road user, wherein the sensor data is further indicative of dimensions of objects loaded or mounted on the combination vehicle,
based on the respective turning motions of the first and the second vehicle units, determining respective trajectories of the first and the second vehicle units, wherein determining the respective trajectories of the first and the second vehicle units is based on dimensions of the respective first and the second vehicle units and further based on the dimensions of the objects loaded or mounted on the combination vehicle, based on the determined trajectories, establishing a region of interest extending along the determined trajectories, determining whether the position of the road user is within the established region of interest, and when the position of the road user is determined to be within the established region of interest, triggering a preventive action, wherein triggering the preventive action comprises any two or more of the following:

triggering an alert, reducing a speed of the combination vehicle, triggering an emergency stop of the combination vehicle, and limiting a steering wheel angle of the first vehicle unit.

2. The method of claim 1, comprising triggering an alert, wherein triggering the alert comprises alerting a driver of the combination vehicle and/or alerting the road user by triggering a sound and/or light alert.

3. The method of claim 1, wherein triggering the preventive action is further based on a shortest distance between the position of the road user and any one of the determined trajectories.

4. The method of claim 1, wherein the combination vehicle further comprises a third vehicle unit,
wherein the obtained sensor data is further indicative of traffic information from the sides of the third vehicle unit,
wherein the traffic information is further indicative of a turning motion of the third vehicle unit,
wherein determining the respective trajectories further comprises determining a trajectory of the third vehicle unit based on the turning motion of the third vehicle unit, and
wherein establishing the region of interest further comprises establishing the region of interest extending along the determined trajectory of the third vehicle unit.

5. The method of claim 1, wherein the method further comprises presenting the determined trajectories and the position of the road user on a display comprised in the first vehicle unit.

6. A control unit configured to perform the method of claim 1.

7. A system for a combination vehicle comprising the first vehicle unit and the second vehicle unit, the system comprising the control unit of claim 6, and the set of sensors arranged in communicative connection with the control unit, and wherein the set of sensors comprises sensors configured to be arranged on each side of the first vehicle unit and the second vehicle unit, respectively.

8. The system of claim 7 wherein the set of sensors comprises a set of cameras.

9. The system of claim 7 wherein the set of sensors comprises one or more of:

Light Detection and Ranging (Lidar) sensors, and

Ultrasonic sensors.

10. A combination vehicle comprising a first vehicle unit, a second vehicle unit, and the system of claim 7, wherein each side of the first vehicle unit and the second vehicle unit, respectively, is provided with at least one sensor from the set of sensors.

11. The method of claim 1, wherein triggering the preventative action comprises triggering an alert and reducing a speed of the combination vehicle.

12. The method of claim 1, wherein triggering the preventative action comprises triggering an alert and triggering an emergency stop of the combination vehicle.

13. The method of claim 1, wherein triggering the preventative action comprises triggering an alert and limiting a steering wheel angle of the first vehicle unit.

14. The method of claim 1, wherein triggering the preventative action comprises reducing a speed of the combination vehicle and triggering an emergency stop of the combination vehicle.

15. The method of claim 1, wherein triggering the preventative action comprises reducing a speed of the combination vehicle and limiting a steering wheel angle of the first vehicle unit.

16. The method of claim 1, wherein triggering the preventative action comprises triggering an emergency stop of the combination vehicle and limiting a steering wheel angle of the first vehicle unit.

17. The method of claim 1, wherein triggering the preventative action comprises triggering an alert, reducing a speed of the combination vehicle, and triggering an emergency stop of the combination vehicle.

18. The method of claim 1, wherein triggering the preventative action comprises triggering an alert, reducing a speed of the combination vehicle, and limiting a steering wheel angle of the first vehicle unit.

19. The method of claim 1, wherein triggering the preventative action comprises reducing a speed of the combination vehicle, triggering an emergency stop of the combination vehicle, and limiting a steering wheel angle of the first vehicle unit.

20. The method of claim 1, wherein triggering the preventative action comprises triggering an alert, reducing a speed of the combination vehicle, triggering an emergency stop of the combination vehicle, and limiting a steering wheel angle of the first vehicle unit.

* * * * *